US011441276B2

(12) United States Patent
Stoe et al.

(10) Patent No.: US 11,441,276 B2
(45) Date of Patent: Sep. 13, 2022

(54) MACHINE AND MATERIAL SUPPLY SYSTEM ASSOCIATED WITH MACHINE

(71) Applicant: Caterpillar Paving Products Inc., Brooklyn Park, MN (US)

(72) Inventors: Terry Stoe, Champlin, MN (US); Aaron Matthew Case, St. Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 215 days.

(21) Appl. No.: 16/806,260

(22) Filed: Mar. 2, 2020

(65) Prior Publication Data

US 2021/0269992 A1 Sep. 2, 2021

(51) Int. Cl.
| | | |
|---|---|---|
| *E01C 19/48* | (2006.01) | |
| *B65G 15/12* | (2006.01) | |
| *E01C 19/18* | (2006.01) | |
| *E01C 19/20* | (2006.01) | |

(52) U.S. Cl.
CPC .............. *E01C 19/48* (2013.01); *B65G 15/12* (2013.01); *E01C 19/182* (2013.01); *E01C 19/20* (2013.01); *E01C 2019/2075* (2013.01); *E01C 2301/02* (2013.01)

(58) Field of Classification Search
CPC ........ E01C 19/182; E01C 19/20; E01C 19/48; E01C 2019/2075; E01C 2301/02; B65G 15/12
USPC .......................................... 404/101–110, 118
See application file for complete search history.

(56) References Cited

U.S. PATENT DOCUMENTS

| | | | | | |
|---|---|---|---|---|---|
| 3,054,334 | A | * | 9/1962 | Barber | E01C 19/4853 404/108 |
| 5,722,790 | A | * | 3/1998 | Spray | E01C 19/48 404/108 |
| 5,857,804 | A | * | 1/1999 | Musil | E01C 19/48 404/104 |
| 6,007,272 | A | * | 12/1999 | Macku | E01C 19/1077 404/113 |
| 8,021,078 | B2 | * | 9/2011 | Lamb | E01C 19/48 404/108 |
| 8,591,146 | B2 | * | 11/2013 | Begley | B62D 55/02 404/108 |
| 9,481,966 | B2 | * | 11/2016 | Frelich | E01C 19/48 |
| 9,739,020 | B2 | | 8/2017 | Comer et al. | |
| 10,415,194 | B2 | * | 9/2019 | Neumann | E01C 19/48 |

(Continued)

FOREIGN PATENT DOCUMENTS

| | | | |
|---|---|---|---|
| CN | 102864720 | 1/2013 | |
| CN | 207143686 | * 3/2018 | ............. E01C 19/48 |

(Continued)

*Primary Examiner* — Raymond W Addie
(74) *Attorney, Agent, or Firm* — von Briesen & Roper, s.c.

(57) ABSTRACT

A machine includes a frame. The machine also includes a hopper assembly supported on the frame proximate to a front end of the machine. The machine further includes a conveyor system disposed proximate to the hopper assembly. The conveyor system includes a conveyor belt assembly and a drive mechanism adapted to operate the conveyor belt assembly. The machine includes a bumper extending transversely across the front end of the machine. The bumper defines an opening that is adapted to communicate with a portion of the drive mechanism disposed proximate to the bumper.

20 Claims, 4 Drawing Sheets

(56) References Cited

U.S. PATENT DOCUMENTS

| | | | | |
|---|---|---|---|---|
| 2004/0146354 A1* | 7/2004 | Goodwin | ............... | E01C 19/48 404/108 |
| 2004/0223808 A1* | 11/2004 | Romier | .................. | E01C 19/46 404/75 |
| 2016/0040368 A1* | 2/2016 | Frelich | .................... | E01C 19/48 404/110 |
| 2016/0060823 A1* | 3/2016 | Erdtmann | ............... | E01C 19/48 404/110 |

FOREIGN PATENT DOCUMENTS

| | | | | |
|---|---|---|---|---|
| DE | 202012101905 | | 10/2013 | |
| FR | 0162792 | * | 5/1985 | ............. E01C 19/46 |

* cited by examiner

MACHINE AND MATERIAL SUPPLY SYSTEM ASSOCIATED WITH MACHINE

TECHNICAL FIELD

The present disclosure relates to a machine having a material supply system associated therewith.

BACKGROUND

A paving machine includes a hopper assembly that receives material, such as asphalt, from a dump truck. The hopper assembly delivers the material to a conveyor system of the machine. The conveyor system is used to convey the material to an auger of the machine. Further, the auger spreads the material in front of a screed of the machine for compaction purposes. The conveyor system includes conveyor plates that are operated by a drive assembly. The drive assembly includes a number of chains disposed below the conveyor plates. The chains cause movement of the conveyor plates for material transfer.

As per application requirements, a personnel may have to access the chains of the drive assembly for servicing/maintenance or adjustment purposes. Typically, the chains are accessed from a recess that is defined between the chains and a bumper of the machine. The recess includes a large area to allow the personnel to access the chains. Further, the recess is covered by an apron having a size corresponding to the size of the recess. Such large-sized aprons promote material buildup in the machine and also interrupt material flow, thereby affecting an efficiency of the conveyor system.

U.S. Pat. No. 9,739,020 describes a conveyor system adapted for use on an asphalt paver comprising a conveyor system frame, a first pulley that is rotatably mounted to the frame, a second pulley that is rotatably mounted to the frame and spaced apart from the first pulley, and a belt having a pulley-contacting surface and an asphalt-contacting surface and being disposed around the first pulley and the second pulley. The preferred conveyor system also comprises a wiper that is adapted to remove asphaltic material from the asphalt-contacting surface of the belt and a means for rotating the first pulley that is adapted to rotate the first pulley. The preferred conveyor system is adapted to convey asphaltic material between a first area adjacent to the second pulley and a second area adjacent to the first pulley. A method for conveying asphaltic material in a paver comprising providing a conveyor system and conveying asphaltic material.

SUMMARY OF THE DISCLOSURE

In an aspect of the present disclosure, a machine is provided. The machine includes a frame. The machine also includes a hopper assembly supported on the frame proximate to a front end of the machine. The machine further includes a conveyor system disposed proximate to the hopper assembly. The conveyor system includes a plurality of conveyor plates and a drive mechanism adapted to operate the plurality of conveyor plates. The machine includes a bumper extending transversely across the front end of the machine. The bumper defines an opening that is adapted to communicate with a portion of the drive mechanism disposed proximate to the bumper.

In another aspect of the present disclosure, a material supply system associated with a machine is provided. The material supply system is disposed proximate to a front end of the machine. The material supply system includes a hopper assembly. The material supply system also includes a conveyor system disposed proximate to the hopper assembly. The conveyor system includes a plurality of conveyor plates and a drive mechanism adapted to operate the plurality of conveyor plates. The material supply system further includes a bumper extending transversely across the front end of the machine. The bumper defines an opening that is adapted to communicate with a portion of the drive mechanism disposed proximate to the bumper.

Other features and aspects of this disclosure will be apparent from the following description and the accompanying drawings.

DETAILED DESCRIPTION

Figure 1:
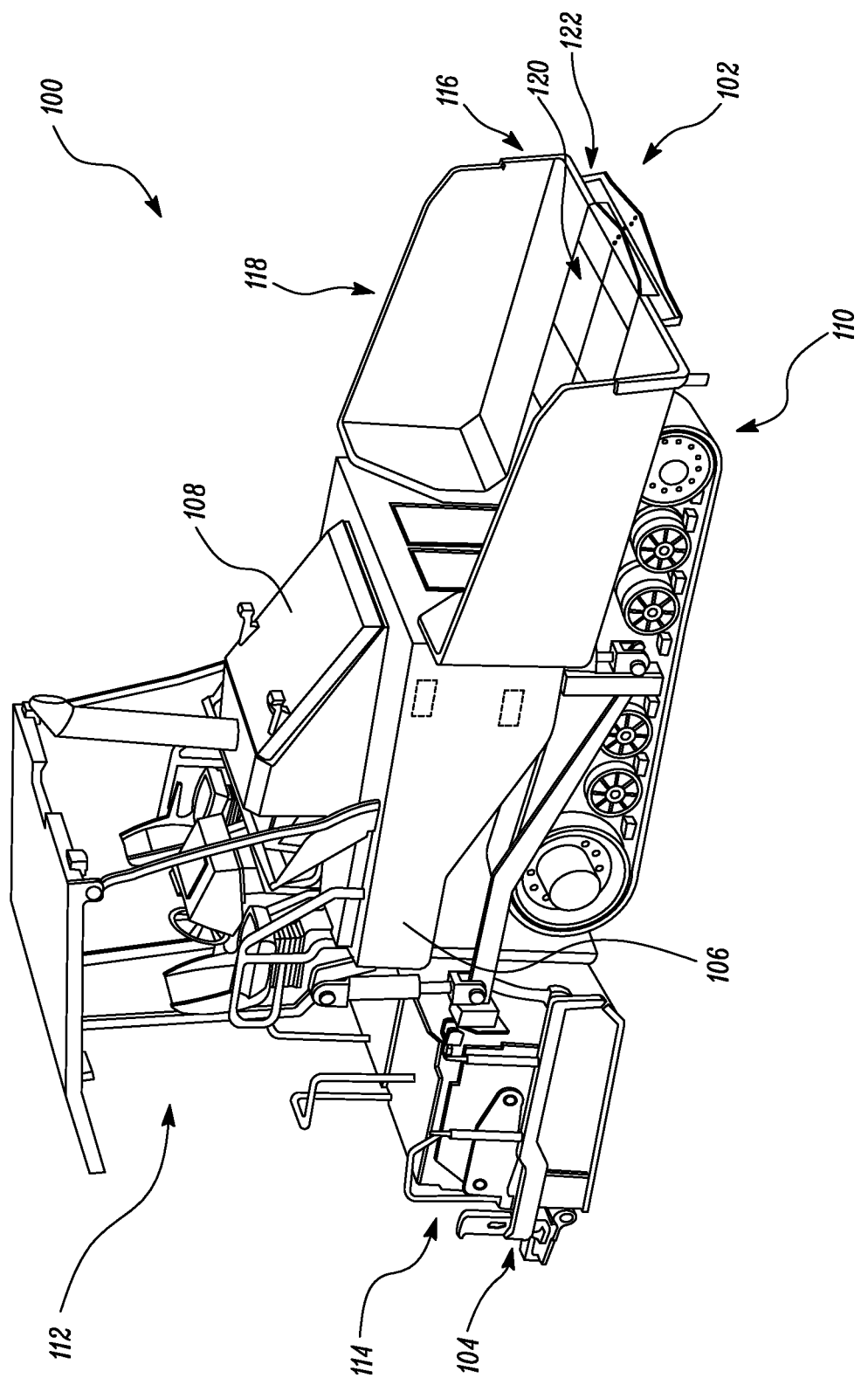
FIG. 1 is a perspective view of a machine, according to one embodiment of the present disclosure.

Wherever possible, the same reference numbers will be used throughout the drawings to refer to the same or like parts. Referring to FIG. 1, a perspective view of an exemplary machine 100 is illustrated. The machine 100 is embodied as a paver, and more particularly, an asphalt paver that may be used for laying asphalt on ground surfaces, such as a roadway. Alternatively, the machine 100 disclosed herein may be embodied for use as, for example, a concrete paving machine or another paving machine that can be used to lay other suitable aggregates of base materials known to persons skilled in the art.

The machine 100 defines a front end 102 and a rear end 104. The machine 100 includes a frame 106. The frame 106 supports various components of the machine 100 thereon. The machine 100 includes an enclosure 108 mounted on the frame 106. The enclosure 108 encloses a power source (not shown) therein. The power source may be any power source, such as an internal combustion engine, batteries, motor, and so on. The power source provides power to the machine 100 for operational and mobility requirements.

The machine 100 also includes a set of ground engaging members 110, one of which is illustrated in the accompanying figure. The ground engaging members 110 are operably coupled to the frame 106. In the illustrated embodiment, the ground engaging members 110 include tracks. In other embodiments, the ground engaging members 110 may include wheels, or a combination of tracks and wheels. The ground engaging members 110 support and provide mobility to the machine 100 on ground surfaces. The machine 100 also includes a machine operator station 112 mounted on the frame 106. The machine operator station 112 is adapted to control various functions associated with the machine 100 and, in some embodiments, functions associated with a screed assembly 114 disposed at the rear end 104 of the machine 100.

Further, the machine 100 includes a material supply system 116. The material supply system 116 is disposed proximate to the front end 102 of the machine 100. The material supply system 116 includes a hopper assembly 118, a conveyor system 120, and a bumper 122. Further, the machine 100 includes the hopper assembly 118 supported on the frame 106 proximate to the front end 102 of the machine 100. The hopper assembly 118 is operably coupled to the frame 106. The hopper assembly 118 receives and holds a volume of material (not shown) received from an external source (not shown), such as a truck or transfer vehicle. In some examples, a push roller device (not shown) is mounted to the machine 100. During receipt of material from the external source, such as the truck, the push roller device allows alignment of the truck with respect to the machine 100. When the truck is aligned, a pair of ground engaging members of the truck abuts the push roller device of the machine 100, thereby ensuring proper alignment of the truck with respect to the machine 100.

Figure 2:
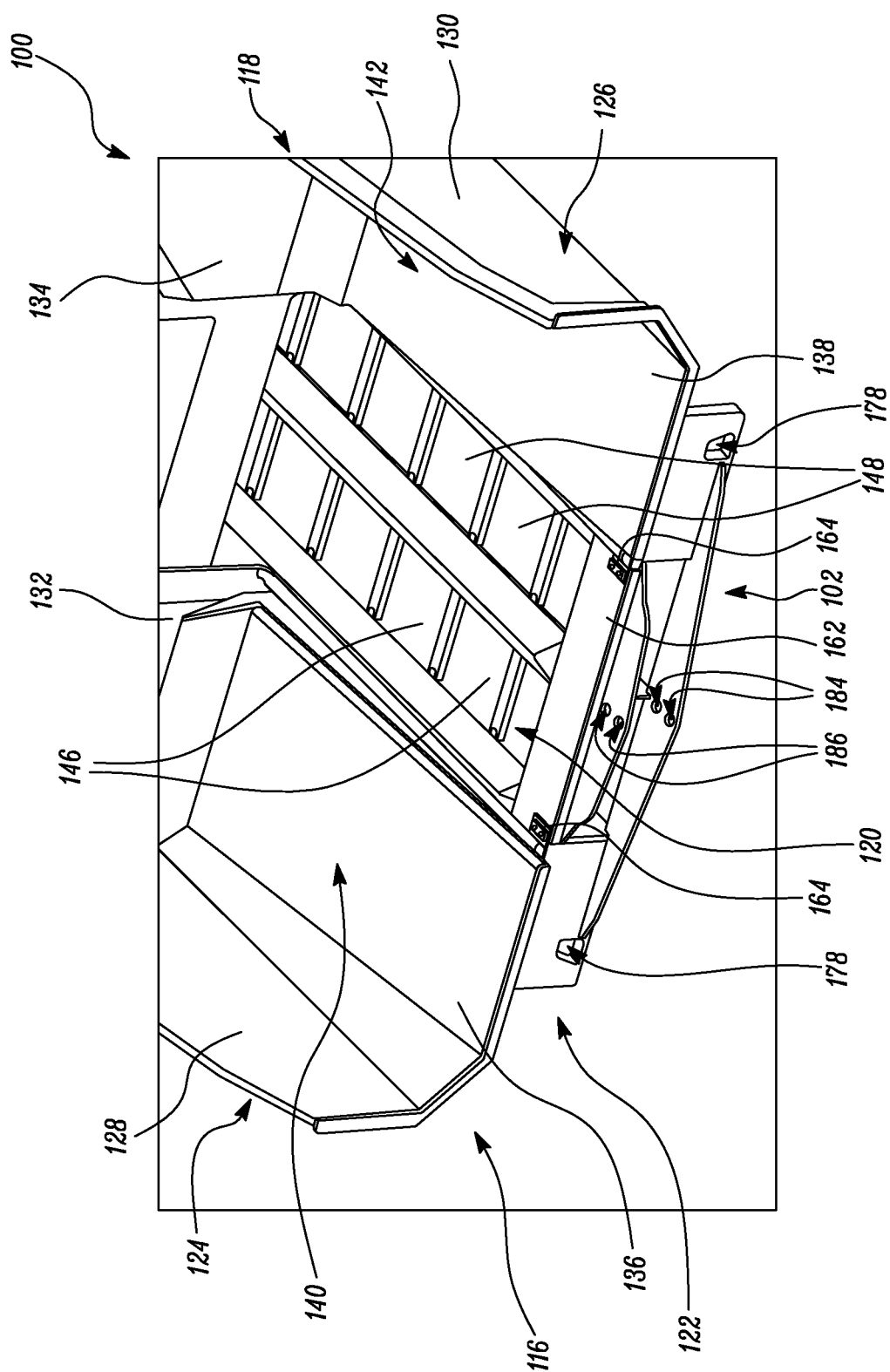
FIG. 2 illustrates a perspective view of a material supply system associated with the machine of FIG. 1.

As shown in FIG. 2, the hopper assembly 118 includes a first hopper 124 and a second hopper 126. Each of the first and second hoppers 124, 126 is movably connected to the frame 106 (see FIG. 1). Further, the first and second hoppers 124, 126 are movable between a lowered position and a raised position. More particularly, the first and second hoppers 124, 126 pivot relative to the frame 106 between the lowered and raised positions.

The first and second hoppers 124, 126 are shown in the lowered position in the accompanying figures. Each of the first and second hoppers 124, 126 include a first sidewall 128, 130, a second sidewall 132, 134, and a third sidewall 136, 138. The first, second, and third sidewalls 128, 132, 136 of the first hopper 124 together define a material receiving space 140. Further, the first, second, and third sidewalls 130, 134, 138 of the second hopper 126 together define a material receiving space 142. The material received by the first and second hoppers 124, 126 are retained within the material receiving space 140, 142, respectively. Further, as per application requirements, the hopper assembly 118 transfers the material to the conveyor system 120. More particularly, each of the first and second hoppers 124, 126 move to the raised position in order to transfer the material from the material receiving space 140, 142 to the conveyor system 120.

Further, the machine 100 includes the conveyor system 120 disposed proximate to the hopper assembly 118. The conveyor system 120 is disposed between the first and second hoppers 124, 126. More particularly, the conveyor system 120 extends transversally between the first and second hoppers 124, 126. The conveyor system 120 transfers the material towards the rear end 104 (see FIG. 1) of the machine 100. More particularly, the conveyor system 120 directs the material towards an auger (not shown) that is disposed at the rear end 104. The auger evenly distributes the material in front of the screed assembly 114 (see FIG. 1) of the machine 100. The screed assembly 114 in turn spreads and compacts the material deposited on ground surfaces.

Figure 3:
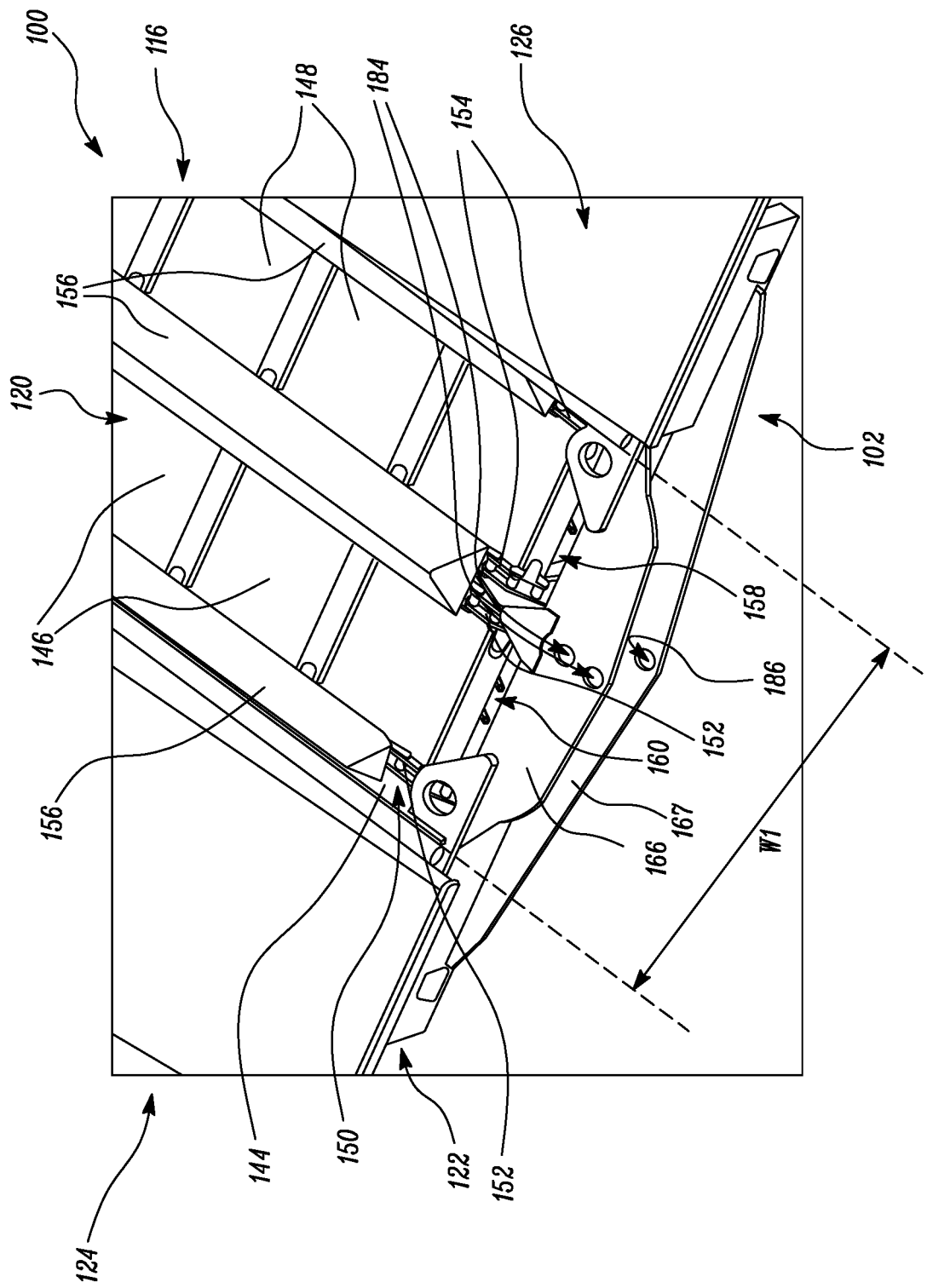
FIG. 3 illustrates a perspective view of a conveyor system and a bumper associated with the machine of FIG. 1.

Referring to FIG. 3, the conveyor system 120 defines a width "W1". The conveyor system 120 includes a conveyor frame 144. Further, the conveyor system 120 includes a number of conveyor plates 146, 148 and a drive mechanism 150 adapted to operate the number of conveyor plates 146, 148. The number of conveyor plates 146, 148 include the first conveyor plates 146 and the second conveyor plates 148. The first conveyor plates 146 receive material from the first hopper 124, whereas, the second conveyor plates 148 receive material from the second hopper 126. The first and second conveyor plates 146, 148 are driven by the drive mechanism 150 to direct the material towards the auger Further, the drive mechanism 150 includes a pair of first chains 152 and a pair of second chains 154 disposed adjacent to the pair of first chains 152. Each of the first chains 152 are parallel to each other and each of the second chains 154 are parallel to each other. Each of the pair of first and second chains 152, 154 form a closed loop around a drive sprocket (not shown) and a driven sprocket (not shown). The drive sprockets may be driven by a motor, such as a hydraulic motor. Further, the drive sprockets drive the respective pair of first and second chains 152, 154. Each of the pair of first and second chains 152, 154 in turn drive the driven sprockets.

The pair of first chains 152 drive the first conveyor plates 146 and the pair of second chains 152, 154 drive the second conveyor plates 148. The pair of first chains 152 are disposed below the first conveyor plates 146. Whereas, the pair of second chains 154 are disposed below the second conveyor plates 148. A movement of each of the pair of first and second chains 152, 154 cause a movement of the first and second conveyor plates 146, 148, respectively, thereby allowing delivery of material towards the auger. It should be noted that a tension in each of the pair of first and second chains 152, 154 may be adjusted as per application requirements. In some examples, the conveyor system 120 may include a tension adjustment mechanism (not shown) for adjusting the tension in each of the pair of first and second chains 152, 154. Further, the conveyor systems 120 includes rail portions 156 that cover each of the pair of first and second chains 152, 154. The conveyor systems 120 includes three rail portions 156 extending longitudinally across the machine 100.

Further, a recess 158 is defined between the conveyor plates 146, 148 and the bumper 122. The recess 158 has a generally rectangular shape. The recess 158 extends transversely between the first and second hoppers 124, 126. A portion 160 is in communication with the recess 158 defined between the bumper 122 and the number of conveyor plates. The portion 160 of the drive mechanism 150 is disposed proximate to the bumper 122. The recess 158 allows access to the portion 160 of the drive mechanism 150. More particularly, each of the pair of first and second chains 152, 154 may be accessed through the recess 158.

Further, the machine 100 includes an apron 162 (shown in FIG. 2) adapted to enclose the recess 158. The apron 162 is rectangular in shape. The apron 162 extends between the first and second hoppers 124, 126. Further, the apron 162 extends longitudinally between the bumper 122 and the rail portions 156. The apron 162 is pivotally coupled to the conveyor frame 144 of the conveyor system 120. The apron 162 is coupled to the conveyor frame 144 of the conveyor system 120 using mechanical fasteners 164 (shown in FIG. 2). The mechanical fasteners 164 may embody bolts, screws, pins, and the like. The apron 162 may be pivoted relative to the conveyor frame 144 to access each of the pair of first and second chains 152, 154 and closed thereafter.

Figure 4:
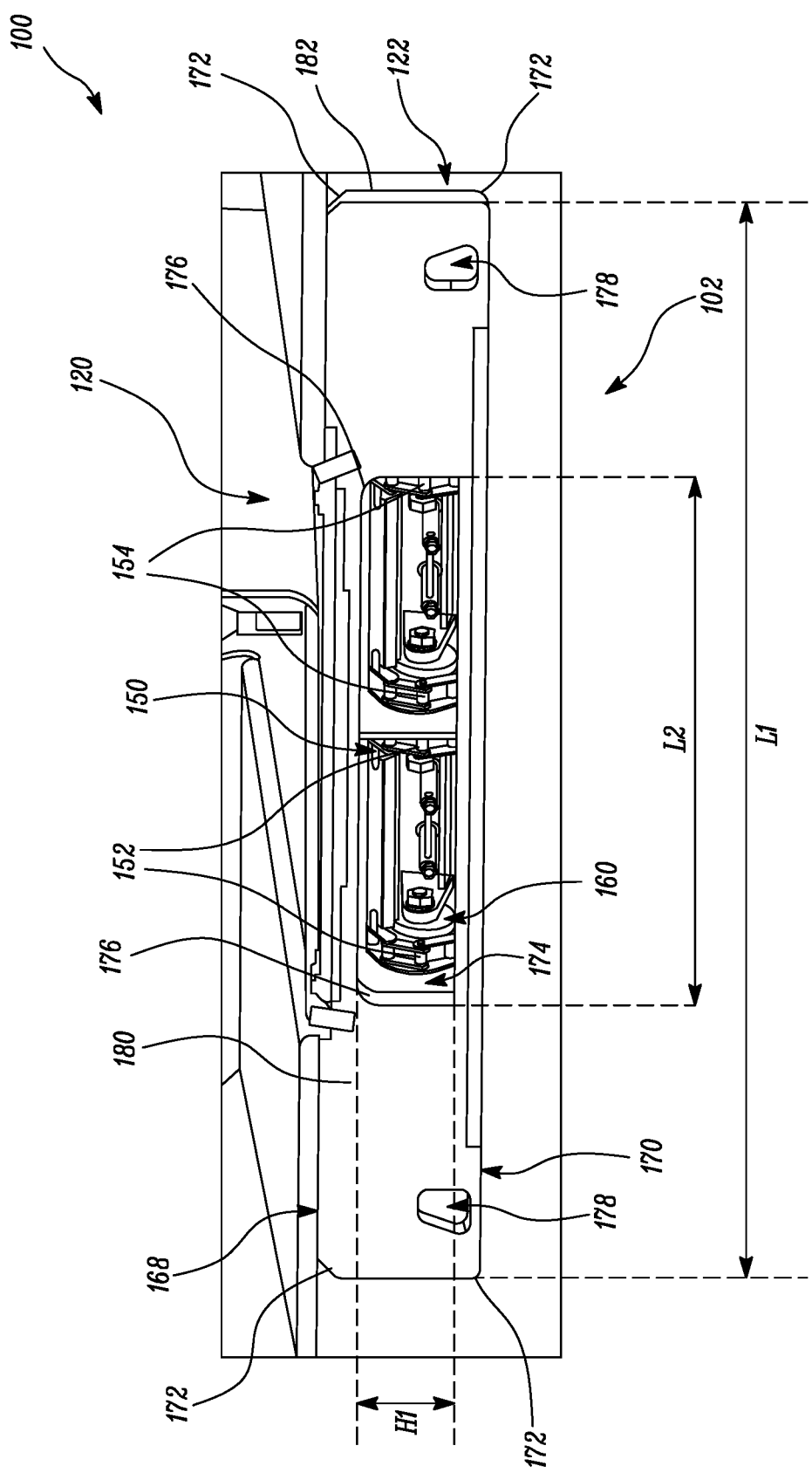
FIG. 4 illustrates the bumper and a portion of a drive mechanism associated with the machine of FIG. 1.

As shown in FIG. 4, the machine 100 includes the bumper 122. The bumper 122 extends transversely across the front end 102 of the machine 100. The bumper 122 is coupled with the frame 106 (see FIG. 1) of the machine 100 by welding. The bumper 122 is disposed such that the bumper 122 is spaced apart from the drive mechanism 150. The bumper 122 described herein is embodied as an impact absorption device. Further, the bumper 122 also allows mounting of the push roller device to the machine 100.

The bumper 122 is generally rectangular in shape. The bumper 122 includes a number of first curved corners 172. The bumper 122 extends along a length "L1". The length "L1" of the bumper 122 is greater than the width "W1" (see FIG. 3) defined by the conveyor system 120. The bumper includes a front surface 180 and a rear surface 182 that is disposed opposite to the front surface 180. The bumper 122 defines an upper end 168 and a lower end 170. The rear surface 182 of the bumper 122 is coupled with the frame 106 proximate to the upper end 168. Further, the lower end 170 is suspended freely.

The bumper 122 includes a pair of mounting plates 166, 167 (shown in FIG. 3) that allow mounting of the push roller device with the bumper 122. The plate 166 extends perpendicularly from the front surface 180 of the bumper 122 proximate to the upper end 168. Further, the plate 167 extends perpendicularly from the front surface 180 proximate to the lower end 170. Further, each of the mounting plates 166, 167 include a pair of through-holes 184, 186 (shown in FIGS. 2 and 3), respectively. The through-hole 184 in the mounting plate 166 aligns with a through-hole (not shown) in the push roller device and a corresponding though-hole 186 in the mounting plate 167 to receive a pin (not shown). The pin allows coupling of the push roller device with the bumper 122. The pair of through-holes 184, 186 in each of the mounting plates 166, 167, respectively, allow fore/aft adjustment of the push roller device relative to the bumper 122.

The bumper 122 further includes a pair of mounting holes 178. The mounting holes 178 allow connection of the machine 100 with a pulling device, such as chains, for transportation of the machine 100. The bumper 122 is made of a metal, such as steel. The bumper 122 may be manufactured using any manufacturing process generally known in the art. In some examples, the bumper 122 may be manufactured by a casting process.

The bumper 122 defines an opening 174 that is adapted to communicate with the portion 160 of the drive mechanism 150 disposed proximate to the bumper 122. Further, the opening 174 is aligned with the portion 160 of the drive mechanism 150 so that the drive mechanism 150 can be accessed through the opening 174. For example, the opening 174 aligns with the pair of first chains 152 and the pair of second chains 154. Thus, the opening 174 provides access to each of the pair of first and second chains 152, 154. The opening 174 is embodied as a through-opening. The opening 174 is substantially rectangular in shape. Further, the opening 174 defines a pair of second curved corners 176 proximate to the upper end 168 of the bumper 122.

The opening 174 is centrally disposed along the length "L1" of the bumper 122. In some examples, a first length "L2" defined by the opening 174 is approximately equal to half of the length "L1" of the bumper 122. Moreover, the first length "L2" defined by the opening 174 is approximately equal to the width "W1" of the conveyor system 120. In some examples, the first length "L2" may be such that the first length "L2" is greater than a distance defined between the outermost chains 152, 154.

The opening 174 also defines a first height "H1". The first length "L2" and the first height "H1" are decided such that the drive mechanism 150, and more particularly the pair of first and second chains 152, 154, may be accessed through the opening 174. It should be noted that a value of the first length "L2" and the first height "H1" may vary based on dimensions and position of the drive mechanism 150.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The bumper 122 provides a simple, effective, and cost-efficient solution for accessing the drive mechanism 150. More particularly, the opening 174 defined by the bumper 122 allows a personnel to access various components of the drive mechanism 150, such as the first and second chains 152, 154. The opening 174 allows access to the drive mechanism 150 during a servicing and maintenance schedule of the machine 100. Further, the opening 174 also allows adjustment of one or more components of the drive mechanism 150. For example, the tension in the first and second chains 152, 154 may be adjusted through the opening 174.

It should be noted that the opening 174 in the bumper 122 provides an additional access to the drive mechanism 150. More particularly, the recess 158 may be used to access the drive mechanism 150 when the push roller device is mounted to the frame 106. However, in the absence of the push roller device, the drive mechanism 150 may be conveniently accessed through the opening 174 in the bumper 122.

Moreover, the provision of the opening 174 in the bumper 122 allows reduction in a size of the recess 158 and the corresponding apron 162. The reduction in the size of the apron 162 provides reduced interruption to material flow by the conveyor system 120 and also reduces material build-up in the conveyor system 120, thereby allowing the conveyor system 120 to operate with improved efficiency. Further, the reduction in the size of the apron 162 also reduces an amount of clean-up work at the end of a workday as material flow at a front area of the hoppers 124, 126 is increased. The reduction in the side of the apron 162 also reduces segregation caused by cold material getting mixed into a mat of the hoppers 124, 126 when the hoppers 124, 126 are cycled between truck exchange.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof

What is claimed is:

1. A machine comprising:
   a frame;
   a hopper assembly supported on the frame proximate to a front end of the machine;
   a conveyor system disposed proximate to the hopper assembly, the conveyor system including a plurality of conveyor plates and a drive mechanism adapted to operate the plurality of conveyor plates; and
   a bumper plate extending transversely across the front end of the machine, wherein the bumper plate defines an opening that is adapted to communicate with a portion of the drive mechanism disposed proximate to the bumper plate, the opening is a through-opening that is aligned with the portion of the drive mechanism, and the opening is configured to allow access to the portion of the drive mechanism through the opening.

2. The machine of claim 1, wherein the opening is substantially rectangular in shape.

3. The machine of claim 1, wherein the opening is centrally disposed along a length of the bumper plate.

4. The machine of claim 1, wherein a first length defined by the opening is approximately equal to a width of the conveyor system.

5. The machine of claim 1, wherein the drive mechanism includes a pair of first chains and a pair of second chains disposed adjacent to the pair of first chains.

6. The machine of claim 5, wherein the opening is adapted to align with the pair of first chains and the pair of second chains.

7. The machine of claim 1, wherein a portion of the drive mechanism is in communication with a recess defined between the bumper plate and the plurality of conveyor plates.

8. The machine of claim 7 further comprising an apron adapted to enclose the recess.

9. The machine of claim 8, wherein the apron is pivotally coupled to a conveyor frame of the conveyor system.

10. The machine of claim 8, wherein the apron is rectangular in shape.

11. A material supply system associated with a machine, wherein the material supply system is disposed proximate to a front end of the machine, the material supply system comprising:
   a hopper assembly;
   a conveyor system disposed proximate to the hopper assembly, the conveyor system including a plurality of conveyor plates and a drive mechanism adapted to operate the plurality of conveyor plates; and
   a bumper plate extending transversely across the front end of the machine, wherein the bumper plate defines an opening that is adapted to communicate with a portion of the drive mechanism disposed proximate to the bumper plate, the opening is a through-opening that is aligned with the portion of the drive mechanism, and the opening is configured to allow access to the portion of the drive mechanism through the opening.

12. The material supply system of claim 11, wherein the opening is substantially rectangular in shape.

13. The material supply system of claim 11, wherein the opening is centrally disposed along a length of the bumper plate.

14. The material supply system of claim 11, wherein a first length defined by the opening is approximately equal to a width of the conveyor system.

15. The material supply system of claim 11, wherein the drive mechanism includes a pair of first chains and a pair of second chains disposed adjacent to the pair of first chains.

16. The material supply system of claim 15, wherein the opening is adapted to align with the pair of first chains and the pair of second chains.

17. The material supply system of claim 11, wherein a portion of the drive mechanism is in communication with a recess defined between the bumper plate and the plurality of conveyor plates.

18. The material supply system of claim 17 further comprising an apron adapted to enclose the recess.

19. The material supply system of claim 18, wherein the apron is pivotally coupled to a conveyor frame of the conveyor system.

20. The material supply system of claim 18, wherein the apron is rectangular in shape.

* * * * *